United States Patent [19]

Lucero et al.

[11] 4,308,544
[45] Dec. 29, 1981

[54] ELECTRONIC ALIGNMENT OF LASER BEAM UTILIZED IN A LASER SCANNING SYSTEM

[75] Inventors: John A. Lucero, Glendora; John A. Carlson, Monrovia; Harry H. Bohling; Richard V. Johnson, both of Pasadena, all of Calif.

[73] Assignee: Xerox Corporation, Stamford, Conn.

[21] Appl. No.: 91,226

[22] Filed: Nov. 5, 1979

[51] Int. Cl.³ .................................... G01D 15/14
[52] U.S. Cl. ................... 346/108; 350/6.8; 358/285
[58] Field of Search ............ 346/108; 358/285, 293; 350/6.8, 6.7

[56] References Cited

U.S. PATENT DOCUMENTS

| | | | |
|---|---|---|---|
| 3,809,806 | 5/1974 | Walker | 346/108 X |
| 4,180,822 | 12/1979 | Hudson | 346/108 |
| 4,195,316 | 3/1980 | Sansome | 358/285 |
| 4,205,348 | 5/1980 | De Benedictis | 358/285 |

Primary Examiner—Joseph W. Hartary
Attorney, Agent, or Firm—Franklyn C. Weiss

[57] ABSTRACT

A technique for adjusting the laser beam in a laser printing system in a simplified, inexpensive manner. The system includes an acousto-optic modulator having a transducer associated therewith. The electronic video stream is mixed with the signal generated by the carrier oscillator, the mixer output being amplified and then applied as a driver signal to the transducer. Means are provided to allow the frequency of the oscillator to be adjusted such that the position of the deflected beam is correspondingly adjusted until the unbalance of the laser beam power at the recording medium due to tolerance build-up between the system components is minimized thereby significantly extending the life of the laser.

3 Claims, 4 Drawing Figures

ELECTRONIC ALIGNMENT OF LASER BEAM UTILIZED IN A LASER SCANNING SYSTEM

BACKGROUND OF THE INVENTION

Recently, printing systems utilizing lasers to reproduce information on laser sensitive mediums have been announced by various manufacturers. Typically, the system includes a laser for generating a laser beam, a modulator, such as an acousto-optic modulator, for modulating the laser beam in accordance with input information to be reproduced, a multi-faceted scanner for scanning the modulated laser beam across a medium on a line to line basis, various optical components to focus and align the laser beam onto the medium, the laser sensitive recording medium itself and, if necessary, a means for developing the information in human readable form. A typical representation of printing systems utilizing lasers is shown, for example, in U.S. Pat. No. 3,922,485, the patent disclosing the use of a xerographic drum as the recording medium and means for developing the latent electrostatic image formed on the drum.

In some printing systems it is required that a cylindrical lens be interposed between the modulated laser beam and the scanner to provide a fan fold light output beam which fully illuminates at least one facet of the scanner. The cylindrical lens is preferably aligned with the laser beam to redistribute the energy of the modulated laser beam in a manner whereby the energy distribution of the laser beam incident on the recording medium is substantially summetrical about the start of scan and end of scan positions of the medium, maximum energy ideally occurring at the center of the scanline. This is particularly important in those systems which utilize a xerographic recording medium.

In general, the laser portion of the overall printing system is regarded as the "weak link" in that the laser would be the first component to fail or in some way become inoperative. The accepted approach, from a field service standpoint, to make the printing system operative, would be to remove the defective laser and replace it with another laser, either a new laser or a repaired laser. In regards to the configuration discussed above, it has been determined that the relative positioning of the laser beam with respect to the cylindrical lens is extremely critical, this critically affecting the energy distribution of the laser beam which scans the medium. If the laser beam is moved with respect to the cylindrical lens a small distance, say for example 0.001 of a inch in the scanning direction, the beam energy incident on the polygon facet will shift a substantial fraction of the facet aperture in the scanning or tangential direction, the displacement being determined by the magnification factor of the cylindrical lens which in turn will effect the beam energy distribution at the surface of the recording medium. The relatively tight tolerance required between the laser beam and the cylindrical lens has made it extremely time consuming and costly to replace the laser independently of the cylindrical lens and maintain the necessary tight tolerances therebetween.

A laser printing system wherein tolerances between the laser beam and certain of the down stream optical elements is maintained within acceptable limits without the attendant increased costs and time delays which would otherwise occur is disclosed in copending application Ser. No. 911,021, now U.S. Pat. No. 4,230,902 assigned to the assignee of the present invention. In particular, the invention disclosed therein provides a technique for maintaining the relative alignment between a laser beam, in a modular laser printing system, and one of the optical elements associated therewith and in particuar, a cylindrical lens, in a manner such that the energy distribution of the beam as it is scanned across a recording medium is maintained at an optimum value. The alignment between the cylindrical lens and the laser beam is maintained by mounting the laser and cylindrical lens to a common support member within a module, each element being fixed with respect to the common support member. If the laser fails or otherwise becomes defective, or if any of the other elements in the module similarly fails, the whole module is capable of being removed and replaced with a similar module. In other words, a field replaceable module is provided such that the required alignment tolerances between the cylindrical lens and the laser beam is maintained. The failed laser in the removed module can be repaired or replaced with a new one, the laser then being mounted in the module, the initially removed module thereafter being capable of being reutilized in the laser printing system. The module output beam, when the module or similar module is replaced in the printing system, retains its relative alignment with system components external to the module.

As set forth hereinabove, a misalignment of the laser beam at the scanner (polygon) will cause a large variation in the beam intensity at the photoreceptor as the scanner rotates to scan the beam thereacross. This is particularly serious when the scanner aperture is smaller or comparable in size to the laser beam diameter.

Although the technique described in the aforementioned copending application substantially eliminates the alignment problems caused in the prior art due to the field replacement of the individual lasers, extremely tight tolerances in the operative laser scanning system has caused difficulties in maintaining system specifications in the field.

What is desired, therefore, is a relatively simple and precise adjustment procedure which will allow the optical system to be realigned by field (or manufacturing line) personnel thus increasing the effective life of the laser as well as the performance of the laser scanning system.

SUMMARY OF THE PRESENT INVENTION

The present invention provides a technique for adjusting the laser beam in a laser printing system in a simplified, inexpensive manner. The system includes an acousto-optic modulator having a transducer associated therewith. The electronic video stream is mixed with the signal generated by the carrier oscillator, the mixer output being amplified and then applied as a driver signal to the transducer. Means are provided to allow the frequency of the oscillator to be adjusted such that the position of the deflected beam is correspondingly adjusted until the unbalance of the laser beam power at the recording medium due to tolerance build-up between the system components is minimized thereby significantly extending the life of the laser.

It is an object of the present invention to provide a technique for adjusting the alignment of a laser beam.

It is a further object of the present invention to provide a technique for adjusting the angular positions of a laser beam utilized in a laser printing system.

It is still a further object of the present invention to provide a simplified technique for field or manufacturing line adjustment of the angular position of a laser beam utilized in a laser printing system to reduce any imbalance of the laser beam at the recording medium utilized in the system.

DESCRIPTION OF THE DRAWINGS

For a better understanding of the invention as well as other objects and features thereof, reference is made to the following description which is to be read in conjunction with the accompanying drawing wherein.

DESCRIPTION OF THE PREFERRED EMBODIMENT

Figure 1:
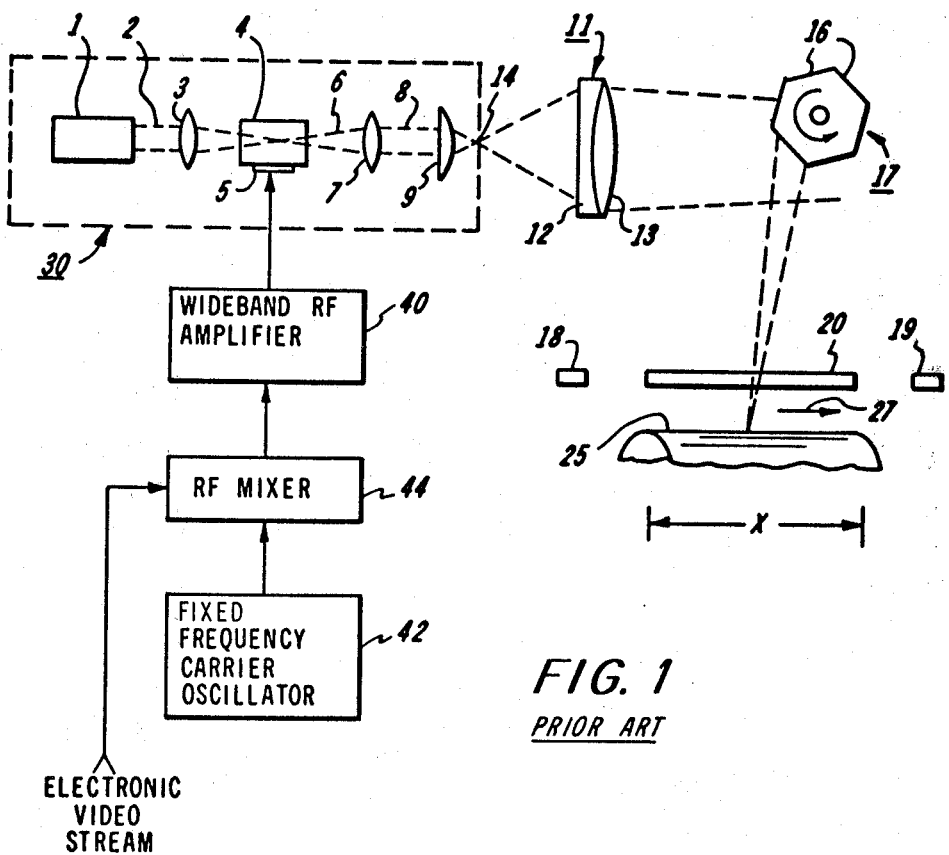
FIG. 1 is a representation of a laser printing system as utilized in the prior art.

FIG. 1 illustrates a simplified representation of the optical and recording portions of the laser printing system in accordance with the present invention.

A light source 1 provides the original light beam for utilization by the printing system. The light source 1 is preferably a laser, such as a helium-cadmium or helium-neon laser, which generates a collimated beam of monochromatic light 2. The monochromatic light beam is focused by spherical lens 3 onto modulator 4, the light beam 2 being modulated in conformance with the information contained in a video signal.

Modulator 4 may be any suitable modulator or modulator/deflector for recording the video information in the form of a modulated light beam 6 at the output of the modulator 4. By means of the modulator 4, typically an acousto-optic modulator, the information within the video signal is represented by the modulated light beam 6.

The light beam 6 is incident on spherical lens element 7 which acts to defocus (or collimate) the incident beam 6. The collimated light output beam 8 from lens 7 is then directed to cylindrical lens 9 which spreads the beam energy in the scan (or tangential) direction (fanfold output) as illustrated by reference numeral 10. Beam 10 is directed to imaging lens 11. Imaging lens 11, in the embodiment illustrated, is a doublet and comprises a biconcave lens element 12 cemented to a convex lens element 13. Other lens arrangements may be utilized, the only requirement being that the imaging lens 11 is capable of forming an image of laser beam spot 14 on the surface of medium 25. Imaging lens 11 produces a beam 15 which impinges upon and may illuminate a plurality of contiguous facets 16 of a scanning polygon 17 as shown.

In the preferred embodiment, the rotational axis of polygon 17 is orthogonal to the plane in which light beams 6 travels. The facets 16 of the polygon 17 are mirrored surfaces for the reflection of any illuminating light impinging upon them. With the rotation of the polygon 17, light beams are reflected from the illuminated facets and turned through a scan angle for flying spot scanning. Alternatively, flying spot scanning could be provided by any other suitable device, such as mirrored piezoelectric crystals or planar reflecting mirrors which are driven in an oscillatory fashion.

Medium 5 may be a xerographic drum (portion illustrated) which rotates consecutively through a charging station comprising a corona discharge device, an exposure station where the beam from the rotating polygon 17 would traverse a scan width x on the drum in the direction of arrow 27 through a developing station depicted by a cascade development enclosure, a transfer station where a web of copy paper is passed in contact with the drum and receives an electrostatic discharge to induce a transfer of the developed image from the drum to the copy paper.

A fusing device fixes the images to the copy paper.

Usable images are provided in that the information content of the scanning spot is represented by the modulator or variant intensity of light respective to its position within the scan width x. As the spot traverses a charged surface, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained thereon. U.S. Pat. No. 3,922,485 describes in more detail the technique for providing usable images. The polygon 17 is continuously driven by a motor (not shown) and may be synchronized in rotation to a synchronization signal representing the scan rate used to obtain the original video signal by the signals generated by start of scan and end of scan detectors 18 and 19, respectively. In the case of the utilization of a xerographic drum, the rotation rate of the drum determines the spacing of the scan lines.

Since runout errors and polygon facet errors may cause poor results in terms of the quality of image transfer to the scanned medium, a cylindrical lens 20 is positioned in the optical path between the polygon and the scanned medium with its aperture aligned with the aperture of the polygon 17. As shown in FIG. 1, the plane of no power of the lens 20 is substantially parallel to the direction of scan or the tangential plane. The interposition of cylindrical lens 20 in the optical path compensates for such runout effects. A more detailed description of the correction effect provided by lens 20 is set forth in U.S. Pat. No. 4,040,096.

A wideband RF amplifier 40 provides the drive signal to the transducer 5 of modulator 4. The output of fixed frequency carrier oscillator 42, utilized to deflect the laser beam to a predetermined position on the polygon (and away from the beam stop shown in FIG. 2A), is applied to one input of mixer 44, the electronic video stream being applied to the other imput of mixer 44. The output of mixer 44 is amplified by amplifier 40 and then applied as a drive signal to transducer 5.

Prior laser printing systems have been typically characterized in that the components utilized have been packaged or assembled in the system without specific attention to the other components with respect to maintaining a fix relative optical alignment therebetween. Further, these prior art systems have not been designed such that the laser component coud be easily removed in the field and replaced or repaired if the laser fails or otherwise becomes inoperative. Further, it has ben determined that the alignment of the laser beam with certain of the optic elements in the beam path is critical in order to be within certain preferred system tolerances as will be explained hereinafter. Removing the inoperative laser from the printing system and then replacing it with a new or repaired laser causes problems since the field or service representative may have to spend considerable time and effort in order to adjust the beam alignment within the desired tolerances. Beam wander induced by misalignment of the laser beam with respect to a subsequent critical optical element in the optical beam path and in particular, with respect to the optical axis of cylindrical lens 9, will significantly affect the beam energy distribution as the polygon 17 causes beam 15 to scan across the surface of medium 25 unless such beam wander can be compensated for. In particular, if the laser beam 8 is moved with respect to cylindrical lens 9 a small distance, say for example 0.001 inch in the tangential or scanning direction, the beam energy incident on the polygon facet 16 will shift a substantial fraction of the facet aperture in the scanning or tangential direction, the displacement being determined by the magnification factor of cylindrical lens 9 which in turn will effect the beam energy distribution at the surface of recording medium 25.

In accordance with the teachings of the invention described in the aforementioned copending application Ser. No. 911,021, the relative alignment between the laser beam and the critical optical element, which in the configuration of FIG. 1, has been determined to by cylindrical lens 9, is maintained by mounting the components or elements shown within dashed box 30 on a common support member to form a module which in turn can be accurately positioned within the remaining portions of the laser printing system.

In order to further improve the alignment capabilities for the laser beam in the printing system shown in FIG. 1 and meet the extremely tight tolerance requirements necessitated in actual field or manufacturing line situations, the present invention provides a simplified and relatively inexpensive technique for the adjustment of the laser beam alignment, the technique having been successfully implemented in the field to service the 9700 Electronic Printing System, manufactured by the Xerox Corporation, Stamford, Conn.

Figure 2:
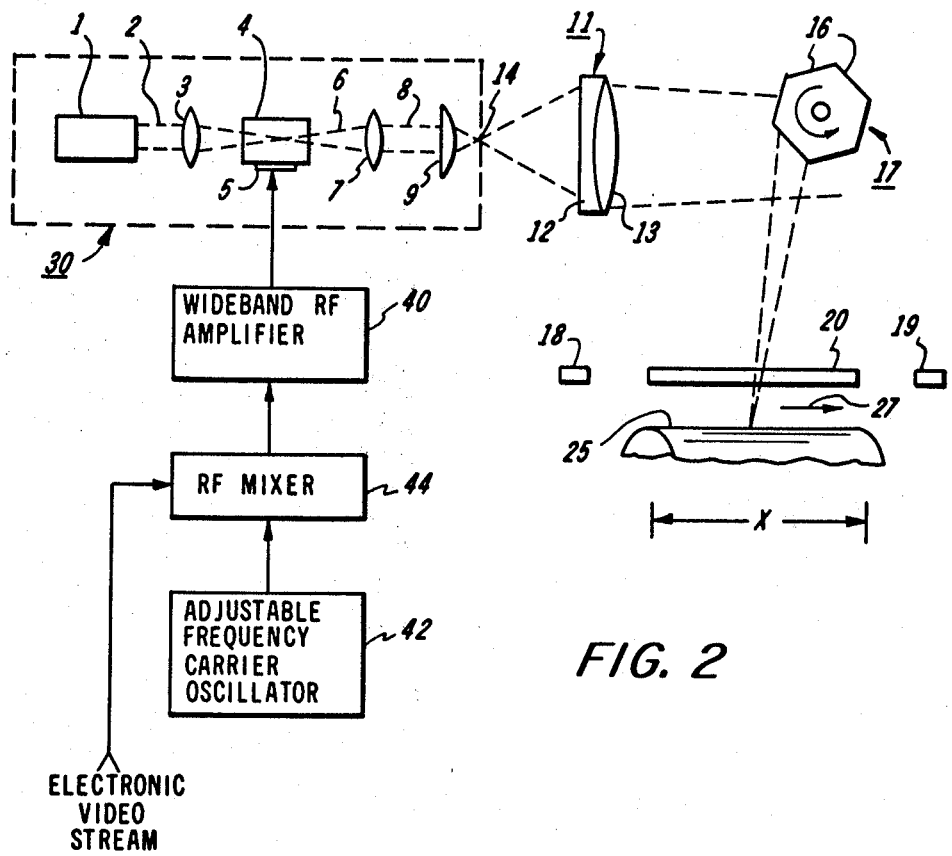
FIG. 2 is a representation of the laser printing system shown in FIG. 1 modified in accordance with the teaching of the present invention.
Figure 2A:
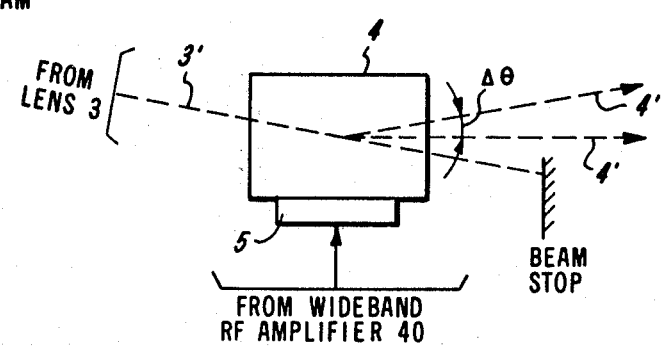
FIG. 2A illustrates the adjustment range $\Delta\theta$.

In particular, the block diagram of FIG. 1 is modified as shown in FIG. 2 in accordance with the teachings of the present invention. The fixed frequency carrier oscillator 42 of FIG. 1 has been replaced by an adjustable frequency carrier oscillator 44. The acousto-optic drive circuit is thereby modified to allow an adjustment of the center frequency of the modulator. The adjustment range (illustrated in FIG. 2A wherein reference numeral 3' represents the incident light beam and reference numeral 4' represents the deflected light beam) in milliradrans, based on system alignment tolerances, $\Delta\theta$, is given by:

$$\Delta\theta = (\lambda \Delta f)/V$$

where $\lambda$ is the optical wavelength in air, $\Delta f$ is the carrier frequency change (sufficiently small as to remain within the bandwidth of modulator RF electronics and transducer 5) and V is the velocity of the acoustic wave in the acoustic medium.

Assuming, for example, that laser 1 comprises a helium-cadmium laser (wave length $\lambda = 4416$ nm), $V = 3.91$ mm/$\mu$sec, and $\Delta f = +5$ MHz, $\Delta\theta$ is equal to $+0.5$ milliradrans (for $\Delta f = -5$ MHz, $\Delta\theta = -0.5$ milliradrans).

Figure 3:
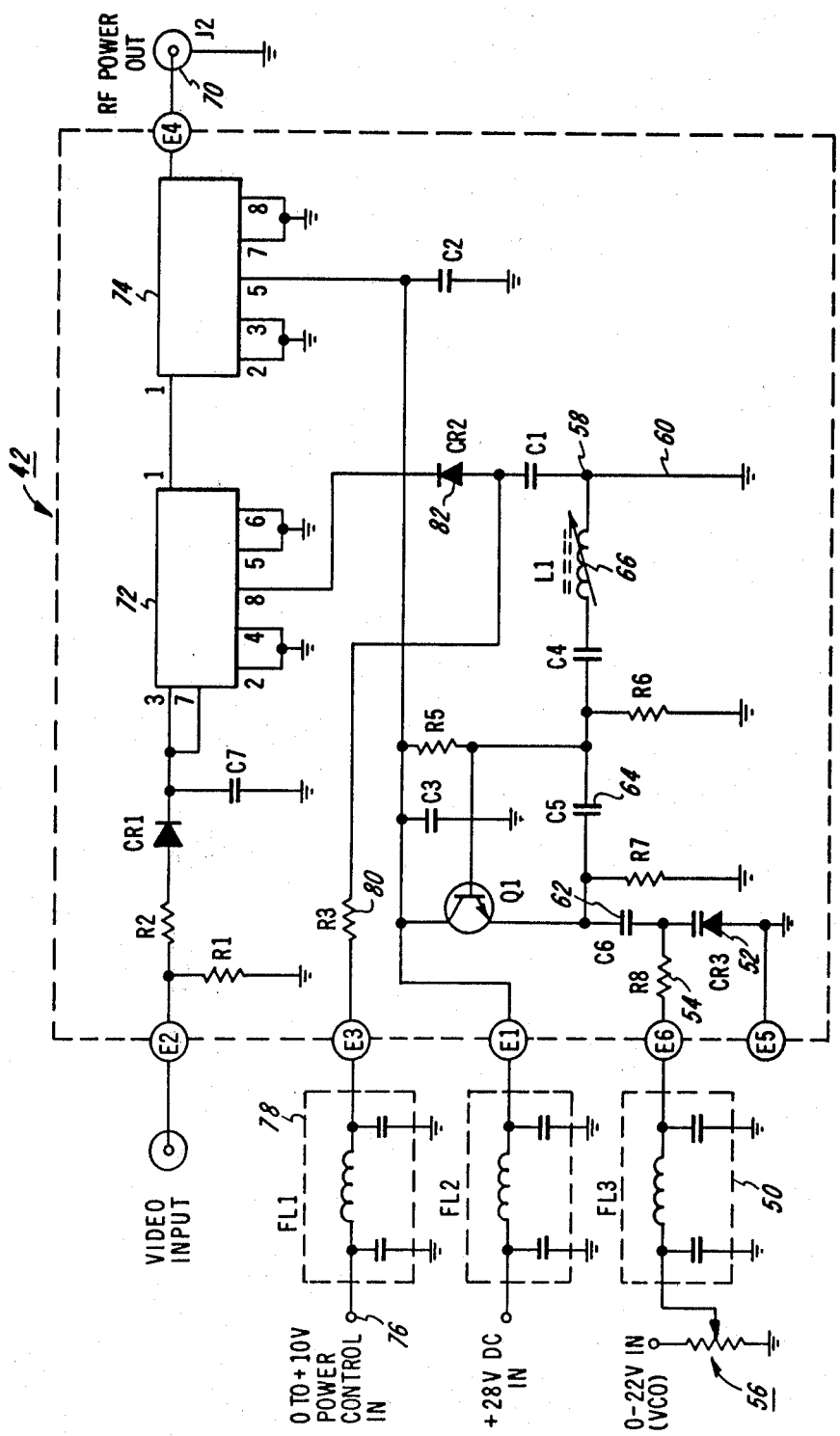
FIG. 3 is a schematic of the driver assembly utilized in the laser printing system shown in FIG. 2.

FIG. 3 is the schematic circuit of the driver assembly in accordance with the teachings of the present invention. The assembly shown is similar to that utilized in the 9700 Electronic Printing System but modified to incorporate the present invention. In essence, the schematic circuit utilized in the original 9700 Electronic Printing System had been modified by the addition of RF filter 50, a MV 2101 variable capacitance diode 52, a 3.3 Kohm resistor 54, two No. 43 bead chokes (not shown) on either side of resistor 54 and a 10 Kohm potentiometer 56, potentiometer 56 being mounted to the side of the illuminator panel described in the above-mentioned copending application to allow access by field or manufacturing personnel. RF filter 50 (a standard RFI Pi filter) is provided in a mounting which is screwed into the drive module and appropriately connected to the follow-on circuitry whereas diode 52 and resistor 54 are appropriately connected within the driver module. The components removed from the prior driver module include the fixed 105 MHz crystal and a 20 ohm resistor between terminal point 58 and ground, the latter resistor being replaced with a #20 Buss wire 60 as shown.

In essence, diode 52 is electrically in series with capacitor 62 and capactiro 64, the series connection of components being in parallel with inductor 66 thereby forming a Colpitts oscillator. The center frequency of the oscillator is selected, by choice of the circuit component values illustrated, to be 105 MHz. Varying the adjustable tap on potentiometer 56 above or below the center point changes the capacitance of diode 52 from the value required to maintain the center frequency at 105 MHz. The potentiometer is arranged to vary the frequency output of the drive circuit appearing at terminal 70 from approximately 100 MHz to about 110 MHz (a range of 10 MHz) which varies $\Delta\theta$ a corresponding amount as set forth hereinabove. Component 72 is the balanced mixer (RF switch) and component 74 is the wideband amplifier, the RF output of terminal 70 being coupled to the modulator transducer 5. The power control input at terminal 76 is applied, via filter 78 and resistor 80, to node point 82 and is utilized to adjust the amplitude of the RF power output.

Typical component designation/values for the circuit shown in FIG. 3 are as follows:

| | |
|---|---|
| R1 = 62 Kohms | C1 = 330 pf |
| R2 = 220 Kohms | C2 = 220 pf |
| R3 = 1.6 Kohms | C3 = 220 pf |
| R4 = 3.3 Kohms | C4 = 330 pf |
| R5 = 15 Kohms | C5 = 120 pf |
| R6 = 1.8 Kohms | C6 = 10 pf |
| R7 = 3.3 Kohms | C7 = 27 pf |
| CR1 = 1N914 | |
| CR2 = HPND-4162 (Hewlett-Packard Corporation) | |
| CR3 = MV2101 (Motorola Corporation) | |
| 56 = 10 Kohms | |
| 72 = MD-108 (Anzac Corporation) | |
| 74 = CA2822-3 (TRW Corporation) | |
| FL1, FL2, FL3 = 3223-000 (United States Ceramic Corporation, Central Laboratory) | |
| Q1 = 2N3866 | |
| L1 = 49A127MPC (J. W. Miller, Division of Bell Laboratories) | |

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A laser printing system which allows for manual optical adjustment by field service personnel comprising: means for generating a beam of high intensity light, a redording medium sensitive to said high intensity light, optical means comprising a plurality of optical elements interposed between said light generating means and said recording medium for imaging said beam to a spot at the surface of said medium, modulating means located between said light generating means and a scanner device for modulating the light beam in accordance with the information content of electrical signals, means coupled to said modulating means for deflecting said modulated light beam to a predetermined position on said scanner, said scanner device comprising a multi-faceted polygon located in the path of said modulated beam between said beam generating means and said recording medium and having reflective facets for reflecting the beam incident thereon onto said medium, means for rotating said polygon such that the reflected light is scanned in successive traces across said medium, wherein the improvement is characterized by:

adjustment means operatively associated with said deflecting means for manually adjusting said laser beam to a position different than said predetermined position to compensate for any misalignment of the laser beam incident on said recording medium, said adjustment means comprising an adjustable potentiometer and said deflecting means comprising an oscillator, said oscillator including an element whose capacitance is variable, wherein the output from said adjustable potentiometer is coupled to said variable capacitance element.

2. The laser printing system as defined in claim 1 wherein said modulating means comprises an acousto-optic modulator.

3. The laser printing system as defined in claim 2 wherein said oscillator comprises a Colpitts oscillator.

* * * * *